(12) United States Patent
An et al.

(10) Patent No.: US 8,718,963 B2
(45) Date of Patent: May 6, 2014

(54) SYSTEM AND METHOD FOR CALIBRATING A THREE-AXIS ACCELEROMETER

(75) Inventors: Dong An, Cupertino, CA (US); Yang Zhao, Andover, MA (US)

(73) Assignee: Memsic, Inc., Andover, MA (US)

( * ) Notice: Subject to any disclaimer, the term of this patent is extended or adjusted under 35 U.S.C. 154(b) by 282 days.

(21) Appl. No.: 13/011,378

(22) Filed: Jan. 21, 2011

(65) Prior Publication Data

US 2011/0264393 A1  Oct. 27, 2011

Related U.S. Application Data

(60) Provisional application No. 61/328,330, filed on Apr. 27, 2010.

(51) Int. Cl.
*G01C 19/00* (2013.01)
*G01P 21/00* (2006.01)

(52) U.S. Cl.
USPC ........................................... 702/104; 73/1.38

(58) Field of Classification Search
USPC ......... 702/104, 33, 35, 81, 84–85, 92, 94–95, 702/127, 141, 145, 147, 150–153, 182–183, 702/189; 73/1.37–1.38, 1.75–1.77, 1.79, 73/488, 497, 504.02–504.03, 73/514.01–514.02
See application file for complete search history.

(56) References Cited

U.S. PATENT DOCUMENTS

2010/0192662 A1*  8/2010  Yanni .............................. 73/1.38

OTHER PUBLICATIONS

Hung et al., Calibration of Accelerometer Triad of an IMU with Drifting Z-Accelerometer Bias, 1989 IEEE, pp. 153-158.*
Frosio et al., Autocalibration of MEMS Accelerometers, Jun. 2009, IEEE Transactions on Instrumentation and Measurement, vol. 58, No. 6, pp. 2034-2041.*
Won et al., A Quarternion-Based Tilt Angle Correction Method for a Hand-Held Device Using an Inertial Measurement Unit, 2008 IEEE, pp. 2971-2975.*

* cited by examiner

*Primary Examiner* — Toan Le
(74) *Attorney, Agent, or Firm* — Preti Flaherty Beliveau & Pachios LLP

(57) ABSTRACT

An integrated calibration system and process for a three-axis (X,Y, Z) accelerometer estimates Z-axis bias, Z-axis bias drift and determines X, Y, and Z-axes error sources based on measurements taken when the accelerometer is static, i.e., sensing only the earth's gravitational acceleration. Optimal on-the-fly error estimates for the three-axis accelerometer are obtained so that the measurements provided by the three-axis accelerometer remain error-free.

33 Claims, 5 Drawing Sheets

SYSTEM AND METHOD FOR CALIBRATING A THREE-AXIS ACCELEROMETER

CROSS-REFERENCE TO RELATED APPLICATION

Priority of U.S. Provisional Patent Application Ser. No. 61/328,330 for "Method For Automatically Calibrating A 3-axis Accelerometer," filed Apr. 27, 2010, is claimed.

STATEMENT REGARDING FEDERALLY SPONSORED RESEARCH OR DEVELOPMENT

N/A

BACKGROUND OF THE INVENTION

The availability of low cost and small microelectromechanical systems (MEMS) accelerometers has created a large variety of new commercial applications with their inclusion in smart phones and other handheld or mobile devices. As compared with other types of MEMS accelerometer technologies, a thermal MEMS accelerometer, which is based on the principle of measuring internal changes of convection heat transfer due to the acceleration applied, has superior advantages for consumer applications, including a low cost fabrication process, high reliability and very good shock or impact resistance. A thermal MEMS three-axis accelerometer usually employs a 2D (2-dimension) sensing structure to achieve three-axis acceleration measurements. As is known, X and Y acceleration measurements can be achieved accurately by their differential signal pickoff mechanizations. Recent advances in thermal MEMS accelerometer design and manufacture further improve bias (zero offset) stability of X and Y axes measurements over time and temperature.

The stability of Z-axis bias, however, is still a real challenge in the industry. Generally, the Z-axis signal, which is picked off the structure by observing the temperature differences at different times of X and Y axes sensing, is a very weak and secondary signal in the three-axis acceleration sensing operation. As a result, the Z-axis measurements have a significantly larger bias drift over temperature as compared to those in the X and Y axes.

In order to provide an accurate three-axis accelerometer at a price point that meets the "low cost philosophy," which is critical for consumer applications, it is highly desirable to achieve a low cost approach for calibrating all axes measurements, especially the Z-axis, of a thermal MEMS three-axis accelerometer.

BRIEF SUMMARY OF THE INVENTION

Embodiments of the present invention provide a calibration process for a three-axis accelerometer device, in which the error estimates of the device over time and temperature ranges is achieved by using acceleration data taken when the device is "static," i.e., not moving or not undergoing acceleration, during normal operation of the three-axis accelerometer. During these static condition periods the three-axis accelerometer senses only the earth's gravitational acceleration. Three estimation processes for error sources are implemented to use the X, Y, and Z acceleration measurements accumulated during these static condition periods so that the error sources of the three-axis accelerometer including Z-axis bias can be estimated and compensated for.

BRIEF DESCRIPTION OF THE SEVERAL VIEWS OF THE DRAWINGS

Various aspects of at least one embodiment of the present invention are disclosed below with reference to the accompanying figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, however, not every component may be labeled in every drawing. These figures are provided for the purposes of illustration and explanation and are not intended as a definition of the limits of the invention. In the figures.

DETAILED DESCRIPTION OF THE INVENTION

U.S. Provisional Patent Application Ser. No. 61/328,330 for "Method For Automatically Calibrating A 3-axis Accelerometer," filed Apr. 27, 2010, is incorporated by reference herein in its entirety and for all purposes.

Embodiments of the present invention provide an affordable and reliable approach for automatically measuring and then removing, or accounting for, the Z-axis bias of a three-axis accelerometer without needing to know the precise orientation of its carrier. This calibration mechanization for a three-axis accelerometer is applicable for many handheld and land applications, e.g., in a vehicle, where the rotation and linear motions are not constantly occurring.

In a three-axis accelerometer, the three acceleration measurements are the three components of a so-called "specific force" or total acceleration vector. Numerous static condition periods, during which the accelerometer's carrier is at rest or under non-acceleration, occur during the normal operation of a three-axis accelerometer in many applications, such as smart phones and automotive or vehicular applications. These static condition periods, wherein a three-axis accelerometer senses only the earth's gravitational acceleration, can be detected or identified. The earth's gravitational acceleration is known and can be a useful reference over time and temperature to estimate a three-axis accelerometer's error sources through real-time data processing, as will be described below.

Advantageously, embodiments of the present invention provide a calibration approach that requires neither a precise mechanical platform nor an oven test. As is known, in an oven test of a device, e.g., an accelerometer sensor, the sensor is placed in an enclosed compartment of the oven having controlled temperature profiles. The oven test identifies the effects of temperature, particularly heat, on the sensor and can also evaluate the effectiveness of a temperature compensation approach as implemented in the sensor.

Figure 1A:
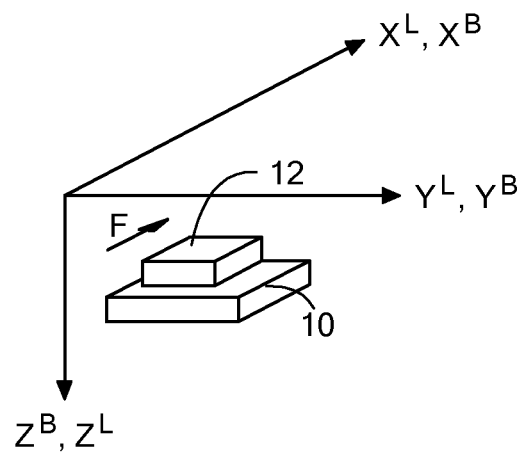
FIGS. 1A, 1B and 1C are representations of a standard coordinate body frame (B) and a local-level frame (L) system with respect to a three-axis accelerometer and its carrier.
Figure 1B:
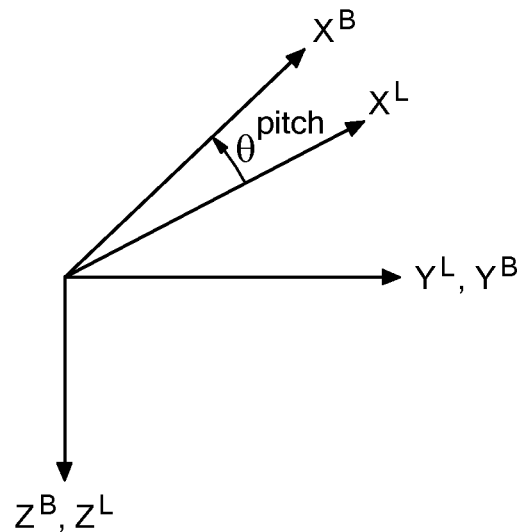
Figure 1C:
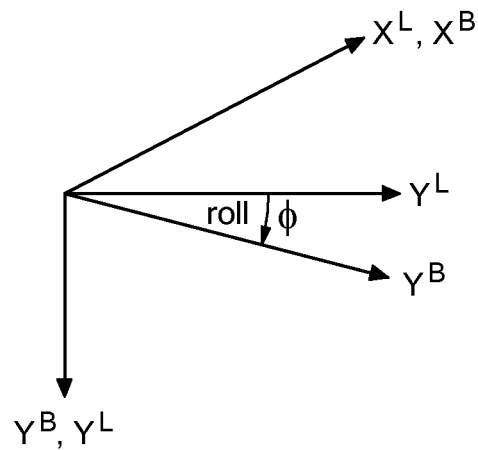

In order to better understand embodiments of the present invention, reference will now be made to FIGS. 1A-1C where a standard coordinate body frame (B) and a local-level frame (L), as known in avionics, are used with respect to a carrier 10 and a three-axis accelerometer 12 that would be attached, or coupled to, the carrier 10. One of ordinary skill in the art will understand that the three-axis accelerometer 12 may incorporate three separate accelerometers orthogonally positioned with respect to one another. The body axis (B) of the carrier 10 is defined as a coordinate frame (B) with a positive $X^B$ axis through the carrier's forward direction, as shown by an arrow F, a positive $Y^B$ axis through the right direction, as shown in the figure, and a positive $Z^B$ axis directed down to complete the right-handed three axes construct. The XYZ axes of the three-axis accelerometer may be aligned with the device's body coordinate frame or with constant misalignment, i.e., an offset, which has no effect on the teachings and embodiments of the present invention as described herein. FIGS. 1A-1C show the relationships between the body frame and the local level frame. The local level frame is mathematically defined so that a roll angle $\phi$ and a pitch angle $\theta$ are also defined. The local-level frame (L) is defined as follows: the X-axis $X^B$ of the body frame (B) is projected to the local level plane as the X-axis $X^L$ of the local-level frame (L); the Y-axis $Y^L$ of the local-level plane is perpendicular to the X-axis $X^L$; and the Z-axis $Z^L$ of the local-level plane is down.

Figure 2A:
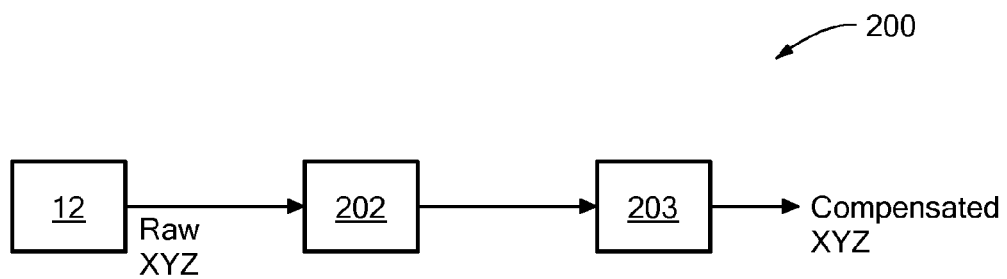
FIGS. 2A and 2B are functional block diagram of an embodiment of the present invention.

As shown in FIG. 2A, generally, a system 200 for calibrating, i.e., compensating for errors in, a three-axis accelerometer in accordance with one embodiment of the present invention includes the three-axis accelerometer 12 outputting a "raw" or non-compensated or otherwise unmodified XYZ signal. An accelerometer interface 202, described in more detail below, receives the raw XYZ signal and sends a corresponding signal to a compensation circuit or module 203, also described in more detail below.

Figure 2B:
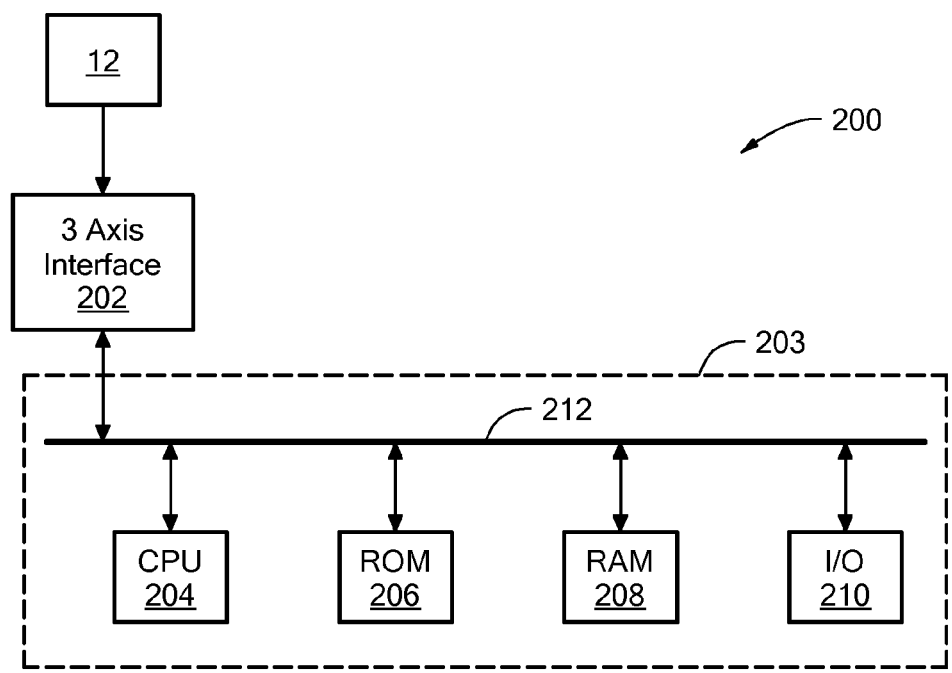

Thus, in further explanation, as shown in FIG. 2B, the compensation module 203 includes a CPU (Central Processing Unit) 204, a Read Only Memory (ROM) device 206, a Random Access Memory (RAM) device 208, an I/O device 210 and a bus 212. As shown, these devices communicate with one another using the bus 212. A protocol used for communicating among the devices and across the bus 212 can be any one of a number of known protocols. Further, while only one bus is shown, one of ordinary skill in the art will understand that multiple busses could be implemented where only certain devices are on a respective bus in communication with one another and some devices may not be on the same bus as others.

The accelerometer interface 202 operates to translate the signals received from the three-axis accelerometer 12 and may include analog signal processing components such as analog-to-digital converters, signal filters, etc. While shown separately in FIG. 2B, the compensation module 203, the interface 202 and the accelerometer 12 could be implemented in a single device having only external connections for the bus 212. Alternatively, any combination or sub-combination of these components into a single package could be provided. In one embodiment, a device including the interface 202 and the compensation module 203 could be provided in a single package in order to provide the compensation features described herein to a known three-axis accelerometer, i.e., a "retrofitting" of an existing device. The interface device 202 could be implemented as an ASIC (Application-Specific Integrated Circuit) device. The ROM device 206 stores various software or firmware programs to be executed by the CPU 204 to implement functions described herein while the RAM device 208 is used to temporarily store data used by the CPU 204 or other devices. One of ordinary skill in the art understands the functionality of these components and further details are not necessary to understand the embodiments of the present invention described herein. Still further, it is understood that the other components that may be found in a commercial device to provide other functions, e.g., power, phone, compass, internet browsing, etc., are not shown here for reasons of clarity.

Figure 3:
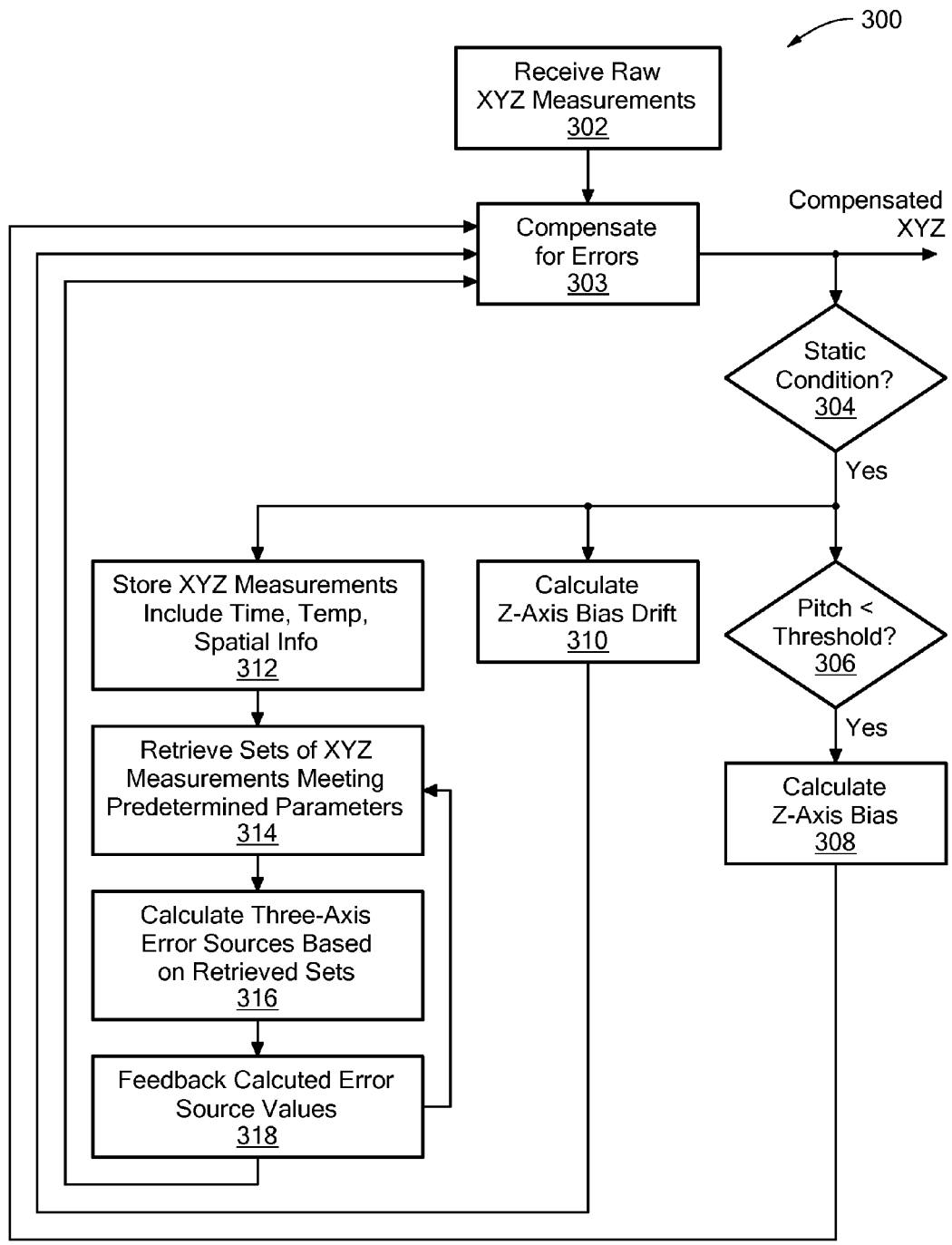
FIG. 3 is a flowchart of a method in accordance with one embodiment of the present invention.

Referring now to FIG. 3, a method 300 in accordance with one embodiment of the present invention calibrates a three-axis accelerometer by scheduling multiple error estimation processes. Embodiments of the present invention observe multiple error sources during many static condition periods that occur during normal operation of the device over expected, i.e., normal, time and temperature ranges.

At step 302, a "raw" or unmodified acceleration measurement stream for each axis X, Y, Z is obtained. It should be understood that an acceleration measurement, i.e., a set of acceleration measurements from a multi-axis device (with either digital outputs or digital outputs from analog outputs through an analog-to-digital converter) is a time discrete signal, $a_i$ where i=0, 1, 2, 3, . . . . A time interval between, sometimes also referred to as a sampling time window or epoch or period, can be equal or changing. Note that the duration of a static condition of the carrier could last a number of continuous epochs.

The raw measurement stream is modified at step 303, i.e., adjusted with error estimates including Z-axis bias and Z-axis bias drift values calculated in accordance with one or more embodiments of the present invention as described below to output a compensated XYZ acceleration signal. The compensated XYZ acceleration signal is monitored, step 304, for an occurrence of a static condition period by either monitoring changes in the XYZ acceleration measurement stream in a time window with a predetermined length, wherein X, Y and Z represent the three sensing axes of the three-axis accelerometer (with/without incorporating information from other sensors) or by other indicators. For example, in many applications, a three-axis accelerometer is used together with other types of sensors or devices, such as when implemented in a wireless phone, i.e., a "smart" phone. These other devices may provide a reliable indication of a static condition.

An indication that the carrier is static can also be detected by receiving a static indicator signal from an external source, such as a vehicle's engine/transmission system where, for example, the engine may be idling, the transmission may be in "Park," the odometer may not be registering any readings, etc. Further, the user interface found in many smart phones may indicate a static or stationary condition; or by incorporating other sensor data as well, such as gyroscopes and a GPS (Global Positioning System) or GNSS (Global Navigation Satellite System) receiver.

As above, each set of acceleration measurements is a time discrete signal. It should be noted that, in some embodiments of the present invention, the acceleration measurements for the calibration processes may be provided as a continuous stream of discrete signals but may be sampled on a regular schedule, e.g., every P signals or every A seconds, or as a function of operating status such as, for example, if the device is in motion then measurements in step 304 might be taken every B seconds or D signals to determine if there is a static condition. Still further, the frequency of measurement sampling may depend upon the type of movement such as, for example, if all movement appears to be only in one direction then measure every C seconds or every S signals. Even further, the system may run on an "interrupt" basis where an asynchronous notification of a static condition period of operation triggers or starts the process. The setting of these intervals A, B and C or P, D, S relative to one another is a design choice and may be based on factors of computation time constraints and power usage.

If it is determined that the carrier is in a static condition, at step 304, three "functionally" independent, but complementary, paths are implemented or initiated in parallel with one another. These are referred to as:

1) Z-axis bias estimation, starting at step 306;
2) Z-axis bias drift estimation, starting at step 310; and
3) X, Y, Z axes error sources estimations, starting at step 312, all of which will be described in more detail below.

With respect to Z-axis bias estimation, control passes to step 306 to compute the pitch angle θ using the X-axis acceleration measurements. If, at step 306, it is determined that the computed pitch angle is less than a predetermined pitch threshold, for example, 20 degrees plus/minus a predetermined tolerance, control passes to step 308 to calculate a Z-axis bias value as will be described below. If, however, the pitch angle is greater than the predetermined pitch threshold, this Z-axis bias estimation will be terminated without a new Z-axis bias estimate being calculated during this static condition period.

For Z-axis bias drift estimation, starting at step 310, the Z-axis bias drift value is calculated, as XYZ measurements continue to be received over the following successive static condition periods if the carrier remains static. At this step 310, an initial magnitude of the total acceleration vector according to the initial XYZ acceleration measurements at the beginning or start of the detected static condition period is compared to the magnitude of the current total acceleration vector formed by a current XYZ acceleration measurement. Advantageously, the Z-axis bias drift value calculated at step 310 suppresses the drift of Z-axis bias when the carrier is sitting statically for an extended time period.

The Z-axis bias value and the bias drift value are fed back to the compensation step 303 and used to provide the compensated XYZ acceleration measurement in order to remove the errors in the measurements.

The X, Y, Z axes error sources estimations begins with the XYZ acceleration measurements being stored in a database along with respective time, temperature and spatial data, step 312. At step 314, those sets of XYZ acceleration measurements that meet predetermined criterion for time and/or temperature and/or spatial distributions are used at step 316 to calculate the error sources of the X, Y, and Z axes sensors. These error sources, including the biases (offsets) and scale factor (sensitivity) errors, are calculated by matching the sets of XYZ acceleration measurements gathered in step 314, which have been accumulated in previously detected static condition periods, with the earth's gravitational acceleration vector. The database may be used to store the numerous sets of XYZ acceleration measurements. Further, the database, although not explicitly shown, could be implemented in either of the ROM or RAM devices.

The calculated error source values are also fed back, step 318, to the error compensation step 303 to improve the accuracy of XYZ acceleration measurements.

In one embodiment, older sets in the database referred to in step 312 may be removed once their age exceeds some predetermined value. Alternately, the database may only store a predetermined number of sets, similar to a FIFO buffer, where the most recent set "pushes out" the oldest set if the buffer is full. If space is not an issue, then all of the XYZ axis measurements may be stored and then the "static" ones can be determined and retrieved as part of the operation in step 314. In this way, the definition of "static" may be changed to be different as implemented at step 304 compared to that at step 314.

Figure 4:
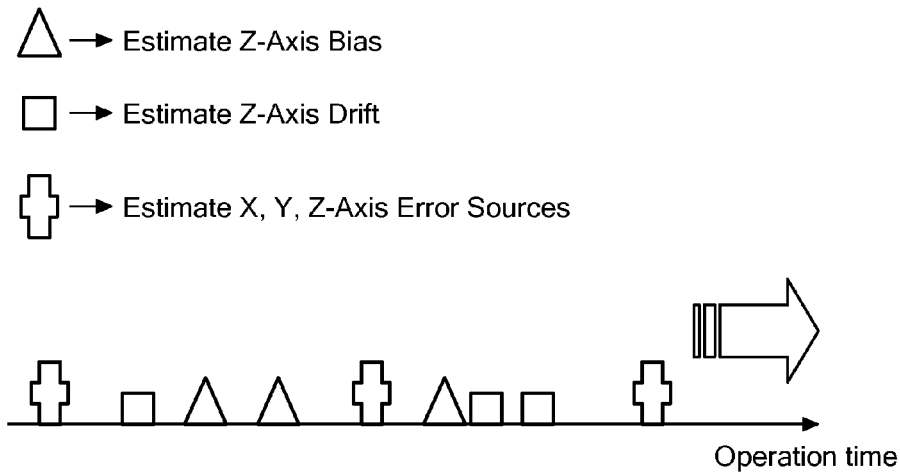
FIG. 4 is a timeline graph of the relative occurrences of the method steps in FIG. 3.

Referring to FIG. 4, the three estimation threads referred to above can be triggered independently and organized automatically as background processes, eliminating errors of the three-axis accelerometer. For a particular three-axis accelerometer, one or two or three estimation threads may be used, based on a tradeoff between computation load and the number of the error sources of the three-axis accelerometer which are expected to be estimated and compensated. Due to the need of the multi static-period measurements for calculating the three-axis error sources in step 316, the Z-axis bias and bias drift calculations, steps 308 and 310, are performed at a higher rate than the error source calculations. The accuracy of estimating Z-axis bias and drift, respectively, is increased, as X and Y axes' error sources are calibrated accurately. The determination of the error sources in step 316 provide a mechanization to estimate the three axes' error sources including biases and scale factor errors, which in turn improves the estimation accuracy of the bias and bias drift. Advantageously, these operations are based on the principle that the error-free measured outputs of a three-axis accelerometer should match the earth's gravitational acceleration vector when its carrier is static. The operations described with respect to steps 308 and 310 serve a "flywheel" functionality which thus maintain the stability of the three axes' biases and measurements.

Advantageously, as implemented in step 308, the roll angle can be computed, or approximated, using Y-axis acceleration measurements that have a graceful degradation, i.e., when the carrier's pitch angle is small and the carrier is static. Detecting static condition periods with a low pitch angle orientation of the carrier provides considerable leverage in Z-axis sensing integrity monitoring because Z-axis measurements can be computed accurately if roll angle and pitch angle are determined accurately. The Z-axis accuracy through all orientations of the carrier benefits from Z-axis bias estimation at low pitch angle orientations.

Figure 5:
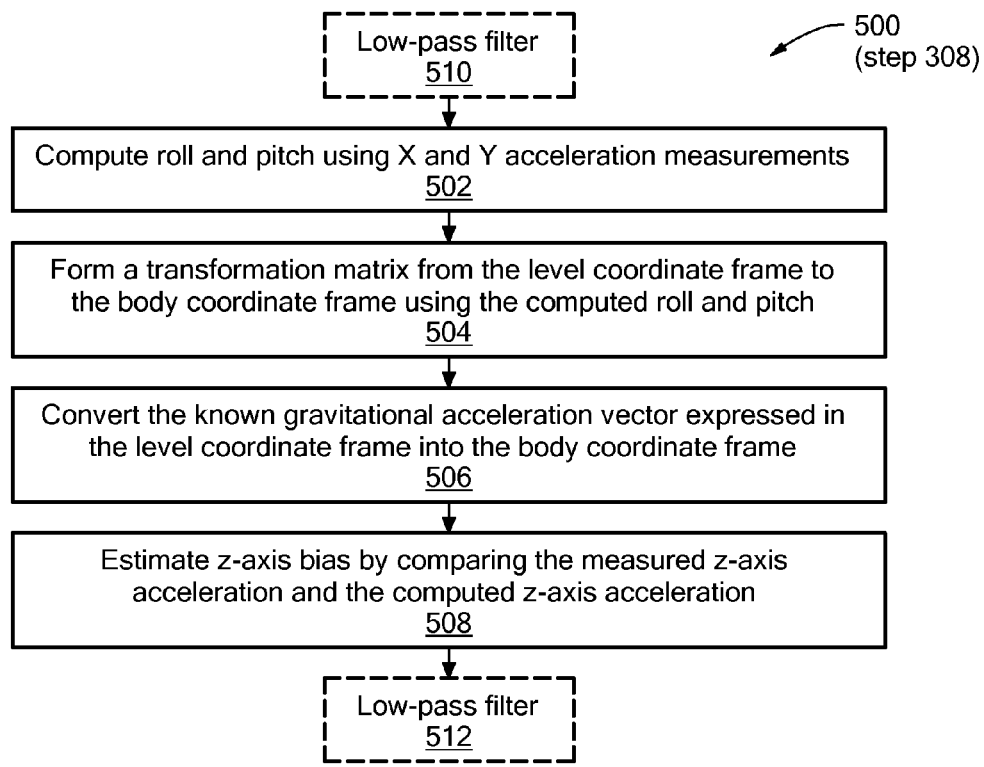
FIG. 5 is a flowchart representing sub-steps of the method of FIG. 3, according to an embodiment of the present invention.

Referring now to FIG. 5, in another embodiment, step 308 includes a method 500 where, at step 502, roll angle and pitch angle values are computed using X and Y acceleration measurements, as described below. At step 504, a transformation matrix is formed from the level frame to the body frame. At step 506, X, Y, and Z acceleration measurements which are expressed in the body frame are computed by converting the earth's gravitational acceleration vector in the level frame into the body frame through the computed transformation matrix from the level frame to the body frame. At step 508, the Z-axis bias is computed by comparing the measured Z-axis acceleration and the computed Z-axis acceleration.

The pitch angle and roll angle calculated in step 502 are computed by using X and Y acceleration measurements. The transformation matrix is formed from the level frame to the body frame in step 504 and computed by using the calculated pitch angle and roll angle. Then, Z-axis bias can be estimated, step 508, as follows:

$$\phi = a\sin(a_y^b) \quad (1)$$

$$\theta = -a\sin(a_x^b) \quad (2)$$

$$C_L^B = \begin{bmatrix} \cos(\theta) & 0 & -\sin(\theta) \\ \sin(\theta)*\sin(\phi) & \cos(\phi) & +\cos(\theta)*\sin(\phi) \\ \sin(\theta)*\cos(\phi) & -\sin(\phi) & \cos(\theta)*\cos(\phi) \end{bmatrix} \quad (3)$$

$$\begin{bmatrix} \hat{a}_x^b \\ \hat{a}_y^b \\ \hat{a}_z^b \end{bmatrix} = C_L^B * \begin{bmatrix} 0 \\ 0 \\ g \end{bmatrix} \quad (4)$$

$$\hat{\Delta}_{az}^b = a_z^b - \hat{a}_z^b \quad (5)$$

Where, $a_x^b$, $a_y^b$ and $a_z^b$=the X, Y and Z axes acceleration measurements expressed in the body frame in "g" units;
φ=roll angle;
θ=pitch angle;
$C_L^B$=transformation matrix from the level coordinate frame (L) to the body coordinate frame (B);
g=gravity;
$\hat{a}_z^b$=the estimated Z-axis acceleration; and
$\hat{\Delta}_{az}^b$ is the estimated Z-axis bias.

For smoothing out noise, the estimated Z-axis bias or the measured X, Y, and Z acceleration measurements can be filtered by a low-pass filter, steps 510, 512. In one embodiment, the low-pass filter operation is implemented digitally in software using known algorithms.

Figure 6:
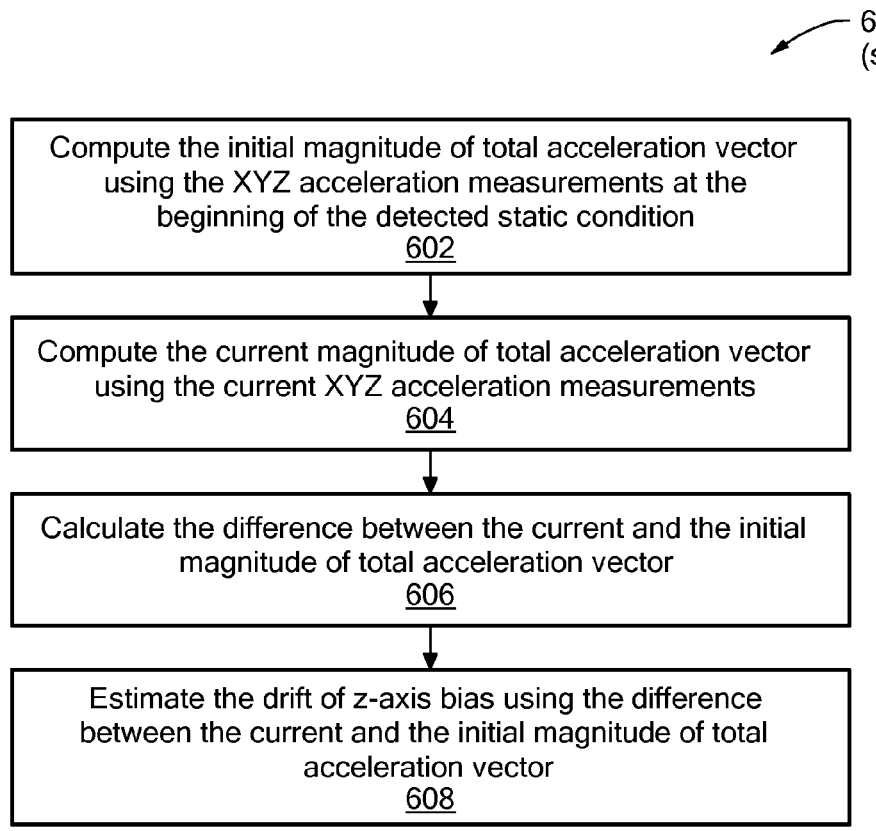
FIG. 6 is a flowchart representing sub-steps of the method of FIG. 3, according to another embodiment of the present invention.

Referring now to FIG. 6, another embodiment of step 310 includes a method 600, where an initial magnitude of the total acceleration vector using the XYZ acceleration measurements at the beginning of the detected static condition is computed at step 602. The current magnitude of the total acceleration vector using the current XYZ acceleration measurements is computed at step 604, as long as the carrier is remaining static. A difference between the current and the initial magnitudes, i.e., at the beginning of the static condition period, of the total acceleration vector is calculated at step 606. The Z-axis bias drift value is calculated using the difference between the current and the initial magnitudes of the total acceleration vector at step 608.

Another embodiment of step 608 can be performed by directly solving the following equations or estimated by a filter, such as an extended Kalman filter and a least square filter:

$$M_0 = \sqrt{(a_{x0}^b)^2 + (a_{y0}^b)^2 + (a_{z0}^b)^2} \quad (6)$$

$$M = \sqrt{(a_x^b)^2 + (a_y^b)^2 + (a_z^b)^2} \quad (7)$$

$$z = M - M_0 = \sqrt{(a_{x0}^b)^2 + (a_{y0}^b)^2 + (a_{z0}^b + D_{az}^b)^2} - M_0 \quad (8)$$

Where, $a_{x0}^b$, $a_{y0}^b$ and $a_{z0}^b$=the X, Y and Z axis acceleration measurements, respectively, at the beginning of the detected static condition period;
$a_x^b$, $a_y^b$ and $a_z^b$=the current X, Y and Z axis acceleration measurements, respectively;
$M_0$=the initial magnitude of the total acceleration vector;
M=the current magnitude of the total acceleration vector;
z=the difference between the current and the initial magnitude of total acceleration vector; and
$D_{az}^b$=the drift of Z-axis bias.

Figure 7:
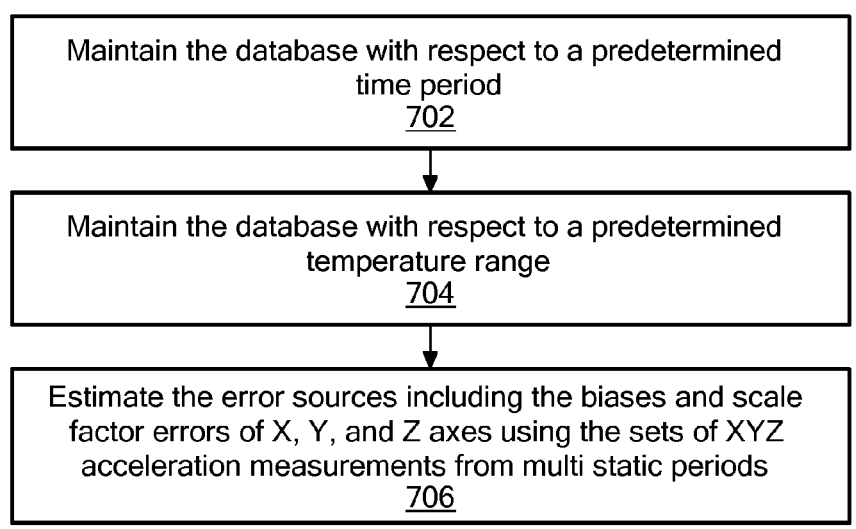
FIG. 7 is a flowchart representing sub-steps of the method of FIG. 3, according to another embodiment of the present invention.

Referring to FIG. 7, another embodiment of Step 316 includes a method 700 where, at step 702, the database is maintained with a time constraint, wherein the sets of XYZ acceleration measurements from the detected static condition periods are accumulated, using the corresponding time tags of the sets of XYZ acceleration measurements, in order to assure that the time tags of the sets of XYZ acceleration measurements are within a predetermined time period. Further, at step 704, the sets in the database are maintained within a temperature constraint, using the corresponding temperature tags of the sets of XYZ acceleration measurements, in order to assure that sets of XYZ acceleration measurements were taken when the device was operating within a predetermined temperature range. As is known, ambient temperature may affect the accuracy or validity of acceleration measurements in a thermal MEMS accelerometer. At step 706, the estimating of the error sources of the X, Y, and Z axes includes the biases and scale factor errors, by matching numerous sets of XYZ acceleration measurements, which have been accumulated in previously detected static condition periods, with the earth's gravitational acceleration vector. The spatial distribution of the sets of XYZ acceleration measurements may be required to meet a predetermined condition, e.g., the sets of XYZ acceleration measurements may have to represent appearances in all of the octants of the three dimensional Cartesian coordinate frame.

The estimation of all three axes' error sources includes the biases and scale factor errors. Steps 702 and 704 are intended to establish a proper data set, so that the estimates of XYZ axis error sources are with respect to the same current time point or period of time. Step 704 could be optional if no temperature tags are available.

The matching process in step 706 can be implemented with two cases:

1) if the orientation of the three-axis device during the static condition period is accurately known, the gravitational acceleration vector can be accurately projected into the three sensing axes and component-matching of gravitational acceleration vector is used; and 2) if the orientation of the three-axis device during the static condition period is not accurately known, the gravitational acceleration vector can not be accurately projected into the three sensing axes and magnitude-matching of gravitational acceleration vector is used.

Step 706 can be tailored to a particular type of three-axis accelerometer. For most MEMS three-axis accelerometers, the dominant errors are scale factor errors, biases, cross-axis and misalignment errors. Step 706 can be formulated as follows:

$$\begin{bmatrix} a_{xc}^b \\ a_{yc}^b \\ a_{zc}^b \end{bmatrix} = \begin{bmatrix} 1/SF_{xx} & 1/SF_{xy} & 1/SF_{xz} \\ 1/SF_{yx} & 1/SF_{yy} & 1/SF_{yz} \\ 1/SF_{zx} & 1/SF_{zy} & 1/SF_{zz} \end{bmatrix} * \begin{bmatrix} a_x^b - b_{ax} \\ a_y^b - b_{ay} \\ a_z^b - b_{ay} \end{bmatrix} \quad (9)$$

Where,
$b_{ax}$, $b_{ay}$, $b_{az}$=the biases of XYZ axes;
$SF_{xx}$, $SF_{yy}$, $SF_{zz}$=scale factors;
$SF_{xy}$, $SF_{xz}$, $SF_{yx}$, $SF_{yz}$, $SF_{zx}$, $SF_{zy}$=misalignment terms; and
$a_{xc}^b$, $a_{yc}^b$ and $a_{zc}^b$=the corrected X, Y and Z axis acceleration measurements.

If the orientation of the three-axis accelerometer at each static condition period is accurately known, the above 12 parameters ($SF_{xx}$, $SF_{xy}$, $SF_{xz}$, $SF_{yx}$, $SF_{yy}$, $SF_{yz}$, $SF_{zx}$, $SF_{zy}$, $SF_{zz}$, $b_{ax}$, $b_{ay}$, $b_{az}$) can be solved by least squares or a Kalman filter from 12 independent sets of XYZ measurements at different static condition periods, because $a_{xc}^b$, $a_{yc}^b$ and $a_{zc}^b$ in equation (9) are exactly known in this situation.

If the orientation of the three-axis accelerometer at each static condition period is unknown, the above 12 parameters can be solved by least squares or a Kalman filter from XYZ measurements at different static condition periods, using the following constraints:

$$(a_{xc}^b)^2+(a_{xc}^b)^2+(a_{xc}^b)^2=g^2 \quad (10)$$

Where, g=the magnitude of the earth's gravitational acceleration vector.

If the misalignment can be ignored or is known and biases and scale factor errors are mainly concerned for automatic calibration, Equation (10) becomes:

$$((a_x^b-b_{ax})/SF_{xx})^2+((a_y^b-b_{ay})/SF_{yy})^2+((a_z^b-b_{az})/SF_{zz})^2=g^2 \quad (11)$$

For a thermal MEMS three-axis accelerometer, if the Z-axis bias drift is the major concern, Equation (10) becomes:

$$(a_x^b)^2+(a_x^b)^2+(a_z^b-b_{az})^2=g^2 \quad (12)$$

One of ordinary skill in the art will understand that while the above-described embodiments were with respect to earth's gravity, the embodiments could be modified to adjust to the gravitational acceleration of a body other than earth if such a system were destined for use there. Such an implementation and use is within the scope of the invention described herein.

Further, the embodiments of the present invention have been described as including the determination of specific values. It is understood that those determinations may be accomplished by a calculation or a calculating step and, therefore, determination and calculation or determining and calculating, as used herein, are representative of the same concepts.

Embodiments of the above-described invention may be implemented in all hardware, or a combination of hardware and software, including program code stored in a firmware format to support dedicated hardware. A software implementation of the above described embodiment(s) may comprise a series of computer instructions either fixed on a tangible medium, such as a computer readable media, e.g., diskette, CD-ROM, ROM, or fixed disk or transmittable to a computer system in a carrier wave, via a modem or other interface device. The medium can be either a tangible medium, including but not limited to optical or analog communications lines, or may be implemented with wireless techniques, including but not limited to radio, microwave, infrared or other transmission techniques. The series of computer instructions whether contained in a tangible medium or a carrier wave embodies all or part of the functionality previously described herein with respect to the embodiments of the present invention. Those skilled in the art will appreciate that such computer instructions can be written in a number of programming languages for use with many computer architectures or operating systems and may exist in machine executable format. It is contemplated that such a computer program product may be distributed as a removable media with accompanying printed or electronic documentation, e.g., shrink-wrapped software, preloaded with a computer system, e.g., on system ROM or fixed disk, or distributed from a server over a network, e.g., the Internet or World Wide Web.

Although various exemplary embodiments of the present invention have been disclosed, it will be apparent to those skilled in the art that changes and modifications can be made which will achieve some of the advantages of the invention without departing from the general concepts of the invention. It will be apparent to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A computer-implemented method of determining error compensation parameters for a three-axis accelerometer, comprising:

receiving, by a computer, a current set of only three acceleration measurements corresponding to, respectively, three (X, Y, Z) orthogonal axes, the current set corresponding to a current time epoch;

determining, by the computer, whether the three-axis accelerometer is in a static condition based on the acceleration measurements from the three-axis accelerometer including sets of only three measurements from previous time epochs and the current time epoch; and if it is determined that the three-axis accelerometer is in the static condition:

performing, by the computer, the following three steps:

determining a pitch angle of the three-axis accelerometer based on the acceleration measurements from the three-axis accelerometer while in the static condition and if the pitch angle is less than a predetermined pitch angle threshold value then calculating a Z-axis bias value as a function of the current set of only three acceleration measurements;

calculating a Z-axis bias drift value, as a function of a plurality of sets of only three acceleration measurements taken while the accelerometer remains in the static condition, wherein the plurality of sets of only three acceleration measurements are received corresponding to the current time epoch and subsequent time epochs in which the accelerometer is in the static condition; and storing a plurality of sets of only three acceleration measurements in a database and calculating error source values for at least one of the X, Y, Z axes as a function of a plurality of sets of only three acceleration measurements that are stored in the database for the time epochs during which the three-axis accelerometer is in the static condition.

2. The computer-implemented method of claim 1, wherein determining whether the three-axis accelerometer is in a static condition comprises at least one of:

detecting the static condition using at least one set of three-axis acceleration measurements;

detecting the static condition using at least one set of three-axis acceleration measurements together with external information; and detecting the static condition by receiving an indication of the static condition from an external source.

3. The computer-implemented method of claim 1, wherein calculating the Z-axis bias value further comprises:

determining the pitch angle as a function of the current set of acceleration measurements; and calculating the Z-axis bias value as a function of the set of acceleration measurements used to determine that the pitch angle is less than the predetermined pitch angle threshold value.

4. The computer-implemented method of claim 1, wherein a first time window is defined during which the accelerometer remains in the static condition and wherein calculating the Z-axis bias drift value comprises:
determining a first magnitude of a first total acceleration vector associated with a first set of acceleration measurements taken at a first point in time in the first time window;
determining a second magnitude of a second total acceleration vector associated with a second set of acceleration measurements taken at a second point in time, subsequent to the first point in time, in the first time window;
determining a difference between the first and second magnitudes, and
calculating the Z-axis bias drift as a function of the determined difference.

5. The computer-implemented method of claim 4, wherein the first point in time represents a start of the first time window.

6. The computer-implemented method of claim 1, wherein calculating the Z-axis bias value comprises:
calculating a pitch angle and a roll angle as a function of the X and Y acceleration measurements in the set of acceleration measurements; and
calculating the Z-axis bias value as a function of the calculated pitch angle, roll angle and the earth's known gravitational acceleration vector.

7. The computer-implemented method of claim 1, wherein calculating the error source values for at least one of the X, Y, Z axes comprises:
retrieving a plurality of stored sets of XYZ acceleration measurements; and
calculating respective error source values for at least one of the X, Y, Z axes as a function of the retrieved plurality of stored sets of acceleration measurements.

8. The computer-implemented method of claim 1, wherein storing the plurality of sets of acceleration measurements further comprises:
storing each set of XYZ acceleration measurements with corresponding data comprising at least one of: time data; temperature data; and spatial data.

9. The computer-implemented method of claim 8, wherein retrieving the plurality of stored sets further comprises:
selecting a set for retrieval if it meets at least one of: a time criteria; a temperature criteria; and a spatial criteria.

10. The computer-implemented method of claim 1, wherein the calculated error source values include the Z-axis bias value.

11. The computer-implemented method of claim 1, wherein, over a given period of time, the Z-axis bias and the Z-axis bias drift values are calculated more often than the error source values.

12. An apparatus for determining error compensation parameters for a three-axis accelerometer, comprising:
a calibration component operative to:
receive a current set of only three acceleration measurements corresponding to, respectively, three (X, Y, Z) orthogonal axes, the current set corresponding to a current time epoch; and
determine whether the three-axis accelerometer is in a static condition based on the acceleration measurements from the three-axis accelerometer including sets of only three measurements from previous time epochs and the current time epoch and if the three-axis accelerometer is determined to be in the static condition:
perform the following three steps:
determine a pitch angle of the three-axis accelerometer based on the acceleration measurements from the three-axis accelerometer while in the static condition and if the pitch angle is less than a predetermined pitch angle threshold value then calculate a Z-axis bias value as a function of the current set of only three acceleration measurements;
calculate a Z-axis bias drift value, as a function of a plurality of sets of only three acceleration measurements taken while the accelerometer remains in the static condition, wherein the plurality of sets of only three acceleration measurements are received corresponding to the current time epoch and subsequent time epochs in which the accelerometer is in the static condition; and
store a plurality of sets of only three acceleration measurements in a database and calculate error source values for at least one of the X, Y, Z axes as a function of a plurality of sets of acceleration measurements that are stored in the database for the time epochs during which the three-axis accelerometer is in the static condition.

13. The apparatus of claim 12, wherein the calibration component is further operative to determine whether the three-axis accelerometer is in a static condition by at least one of:
using at least one set of three-axis acceleration measurements;
using at least one set of three-axis acceleration measurements together with external information; and
receiving an indication of the static condition from an external source.

14. The apparatus of claim 12, wherein the calibration component is further operative to:
determine the pitch angle as a function of the current set of acceleration measurements; and
calculate the Z-axis bias value as a function of the set of acceleration measurements used to determine that the pitch angle is less than the predetermined pitch angle threshold value.

15. The apparatus of claim 12, wherein a first time window is defined during which the accelerometer remains in the static condition and wherein the calibration component is further operative to calculate the Z-axis bias drift value by:
determining a first magnitude of a first total acceleration vector associated with a first set of acceleration measurements taken at a first point in time in the first time window;
determining a second magnitude of a second total acceleration vector associated with a second set of acceleration measurements taken at a second point in time, subsequent to the first point in time, in the first time window;
determining a difference between the first and second magnitudes, and
calculating the Z-axis bias drift as a function of the determined difference.

16. The apparatus of claim 15, wherein the first point in time represents a start of the first time window.

17. The apparatus of claim 12, wherein the calibration component is further operative to calculate the Z-axis bias value by:
calculating a pitch angle and a roll angle as a function of the X and Y acceleration measurements in the set of acceleration measurements; and
calculating the Z-axis bias value as a function of the calculated pitch angle, roll angle and the earth's known gravitational acceleration vector.

18. The apparatus of claim 12, wherein the calibration component is further operative to calculate the error source values for at least one of the X, Y, Z axes by:
retrieving a plurality of stored sets of XYZ acceleration measurements; and
calculating respective error source values for each of the X, Y, Z axes as a function of the retrieved plurality of stored sets of acceleration measurements.

19. The apparatus of claim 12, wherein the calibration component is further operative to store the plurality of sets of acceleration measurements by:
storing each set of XYZ acceleration measurements with corresponding data comprising at least one of: time data; temperature data; and spatial data.

20. The apparatus of claim 19, wherein the calibration component is further operative to retrieve the plurality of stored sets further by:
selecting a set for retrieval if it meets at least one of: a time criteria; a temperature criteria; and a spatial criteria.

21. The apparatus of claim 12, wherein the calibration component is further operative to calculate error source values and wherein the calculated error source values include the Z-axis bias value.

22. The apparatus of claim 12, wherein the calibration component is further operative to, over a given period of time, calculate the Z-axis bias and the Z-axis bias drift values more often than the error source values.

23. A computer software product comprising a non-transitory computer-readable medium in which computer program instructions are stored, which instructions, when read by a computer, cause the computer to perform a method of determining error compensation parameters for a three-axis accelerometer, comprising:
receiving a current set of only three acceleration measurements corresponding to, respectively, three (X, Y, Z) orthogonal axes, the current set corresponding to a current time epoch;
determining whether the three-axis accelerometer is in a static condition based on the acceleration measurements from the three-axis accelerometer including sets of only three measurements from previous time epochs and the current time epoch; and
if it is determined that the three-axis accelerometer is in the static condition:
performing the following three steps:
determining a pitch angle of the three-axis accelerometer based on the acceleration measurements from the three-axis accelerometer while in the static condition and if the pitch angle is less than a predetermined pitch angle threshold value then calculating a Z-axis bias value as a function of the current set of only three acceleration measurements;
calculating a Z-axis bias drift value, as a function of a plurality of sets of only three acceleration measurements taken while the accelerometer remains in the static condition, wherein the plurality of sets of only three acceleration measurements are received corresponding to the current time epoch and subsequent time epochs in which the accelerometer is in the static condition; and
storing a plurality of sets of only three acceleration measurements in a database and calculating error source values for at least one of the X, Y, Z axes as a function of a plurality of sets of only three acceleration measurements that are stored in the database for the time epochs during which the three-axis accelerometer is in the static condition.

24. The computer software product of claim 23, wherein determining whether the three-axis accelerometer is in a static condition comprises at least one of:
detecting the static condition using at least one set of three-axis acceleration measurements;
detecting the static condition using at least one set of three-axis acceleration measurements together with external information; and
receiving an indication of the static condition from an external source.

25. The computer software product of claim 23, the method further comprising:
determining the pitch angle as a function of at least one set of acceleration measurements; and
calculating the Z-axis bias value as a function of the at least one set of acceleration measurements used to determine that the pitch angle is less than the predetermined pitch angle threshold value.

26. The computer software product of claim 23, wherein a first time window is defined during which the accelerometer remains in the static condition and wherein calculating the Z-axis bias drift value comprises:
determining a first magnitude of a first total acceleration vector associated with a first set of acceleration measurements taken at a first point in time in the first time window;
determining a second magnitude of a second total acceleration vector associated with a second set of acceleration measurements taken at a second point in time, subsequent to the first point in time, in the first time window;
determining a difference between the first and second magnitudes, and
calculating the Z-axis bias drift as a function of the determined difference.

27. The computer software product of claim 26, wherein the first point in time represents a start of the first time window.

28. The computer software product of claim 23, wherein calculating the Z-axis bias value comprises:
calculating a pitch angle and a roll angle as a function of the X and Y acceleration measurements in at least one set of acceleration measurements; and
calculating the Z-axis bias value as a function of the calculated pitch angle, roll angle and the earth's known gravitational acceleration vector.

29. The computer software product of claim 23, wherein calculating the error source values comprises:
retrieving a plurality of stored sets of XYZ acceleration measurements; and
calculating respective error source values for each of the X, Y, Z axes as a function of the retrieved plurality of stored sets of acceleration measurements.

30. The computer software product of claim 23, wherein storing the plurality of sets of acceleration measurements further comprises:
storing each set of XYZ acceleration measurements with corresponding data comprising at least one of: time data; temperature data; and spatial data.

31. The computer software product of claim 30, wherein retrieving the plurality of stored sets further comprises:
selecting a set for retrieval if it meets at least one of: a time criteria; a temperature criteria; and a spatial criteria.

32. The computer software product of claim 23, wherein the calculated error source values include the Z-axis bias value.

33. The computer software product of claim 23, the method further comprising, over a given period of time, calculating the Z-axis bias and the Z-axis bias drift values more often than the error source values.

* * * * *